United States Patent [19]

Rokutan

[11] Patent Number: 5,257,249
[45] Date of Patent: Oct. 26, 1993

[54] OPTICAL INFORMATION RECORDING REPRODUCING APPARATUS FOR RECORDING AND REPRODUCING INFORMATION ON A RECORD MEDIUM AND FOR GENERATING TRACK ERROR SIGNALS

[75] Inventor: Takao Rokutan, Higashimurayama, Japan

[73] Assignee: Olympus Optical Co., Ltd., Tokyo, Japan

[21] Appl. No.: 857,239

[22] Filed: Mar. 25, 1992

[30] Foreign Application Priority Data

Mar. 28, 1991 [JP] Japan .................................. 3-064595
May 10, 1991 [JP] Japan .................................. 3-106088

[51] Int. Cl.$^5$ ........................ G11B 27/10; G06K 7/10
[52] U.S. Cl. ............................ 369/44.11; 369/44.26; 369/54; 235/454
[58] Field of Search ............... 369/44.11, 44.12, 44.25, 369/44.26, 44.34, 44.35, 44.54, 58, 44.42; 250/201.5, 201.7; 235/454, 456, 440, 457

[56] References Cited

U.S. PATENT DOCUMENTS

| 4,805,162 | 2/1989 | Stahl et al. | 369/44.38 X |
| 4,851,657 | 7/1989 | Taniguchi et al. | 250/201.7 |
| 4,855,981 | 8/1989 | Kimura et al. | 235/454 X |
| 4,924,199 | 5/1970 | Hashimoto et al. | 369/44.11 X |
| 5,056,080 | 10/1991 | Russell | 369/44.26 |
| 5,155,718 | 10/1992 | Hashimoto et al. | 369/44.32 |
| 5,179,267 | 1/1993 | Hashimoto et al. | 235/440 X |
| 5,179,268 | 1/1993 | Nitto et al. | 235/454 |

OTHER PUBLICATIONS

The reports C—325 of a national autumn meeting of the Institute of Electronics and Communication Engineers of Japan in 1989.

Primary Examiner—Aristotelis Psitos
Assistant Examiner—Thang V. Tran
Attorney, Agent, or Firm—Armstrong, Westerman, Hattori, McLeland & Naughton

[57] ABSTRACT

An optical information recording/reproducing apparatus performs at least one of recording and reproducing of information by applying an optical spot to a record medium having a plurality of guide tracks and a plurality of information tracks. The apparatus has an optical detection device disposed at a position to which an imaging spot of a light reflected from the record medium is applied and having a plurality of optical detection portions arranged in a line in the direction intersecting at substantially right angles an image of at least one guide track so as to detect the light reflected from the optical detection portions and output a signal, an address position specifying circuit for specifying the address positions of a plurality of optical detection portions for scanning the optical detection device, a detector output selecting circuit for selecting the output of a plurality of optical detection portions in accordance with the output from the address position specifying circuit, a detection region setting circuit for setting a guide track detection region having a predetermined width for detecting a guide track, a track position detection circuit for detecting the address positions of optical detection portions corresponding to at least one guide track on the basis of the output from the detector output selecting circuit and the detection region setting circuit, and a track error generating circuit for generating a track error signal on the basis of the output from the track position detection circuit.

15 Claims, 17 Drawing Sheets

(A)

(B)

(A)

(B)

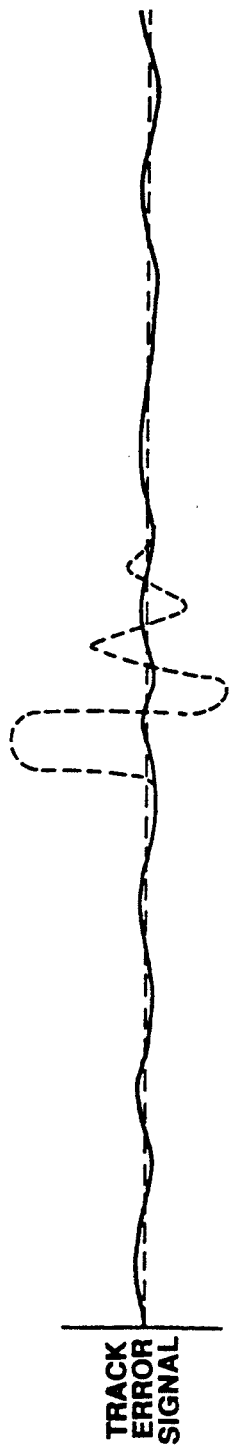

OPTICAL INFORMATION RECORDING REPRODUCING APPARATUS FOR RECORDING AND REPRODUCING INFORMATION ON A RECORD MEDIUM AND FOR GENERATING TRACK ERROR SIGNALS

BACKGROUND OF THE INVENTION

Field of the Invention

The present invention relates to improvement in the generation of a track error signal in an optical information recording/reproducing apparatus which is capable of recording and reproducing information on a record medium.

Description of the Related Art

Optical information recording/reproducing apparatuses have recently attracted attention as mass storage units with the development of the information industry. Such optical information recording/reproducing apparatuses include optical card apparatuses which record and/or reproduce information using optical cards as record media. The optical card has a storage capacity of several thousands times to ten thousand times that of a magnetic card. Although the information on the optical card cannot be rewritten, like optical disks, it is considered to widely use the optical card as a bankbook, a portable map, a prepaid card used for shopping or the like because the storage capacity is as large as 1 to 2 M bytes. In addition, since the information on the optical card cannot be rewritten, it is also considered to use as a personal card for health care or the like, in which alteration of data is not permitted. Various types of optical information recording/reproducing apparatuses which use as record media optical disks are also proposed.

In the optical information recording/reproducing apparatus such as an optical card apparatus or the like, since the read speed is determined by the relative speed between an optical head for reading information and a record medium, if the information on only one track is read by applying light to the track, the read speed cannot be significantly increased.

A method of simultaneously reading information on a plurality of tracks by applying a laser beam to the tracks is thus reported in "High speed optical card reader/writer using two optical sources" in the reports C-325 of a national autumn meeting of the Institute of Electronics and Communication Engineers of Japan in 1989.

In addition, although tracking servo is required for accurately tracking when data on a track is read, stable tracking servo which is not deviated due to dust on a card, defects such as flaws or the like or external vibration is required.

As shown in FIG. 1, an optical card 100 serving as a record medium has an optical record portion 100g comprising ID portions 100e for recording information about the optical card 100 therein and data portions 100f for recording information therein. The optical record portion 100g has a plurality of guide tracks 100a for guiding an optical spot in the track direction and information tracks 100c between the respective guide tracks 100a.

FIG. 2 shows the configuration for detecting a track error signal described in the above-described reports C-325.

FIG. 2 shows a part of an optical card 100 which has guide tracks 100a and information tracks 100c each having record pits 100b formed thereon between the respectively guide tracks 100a. An optical head applies the laser beam emitted from a laser source (not shown) to the optical card 100 through an objective lens 101 and detects a track error signal (TES) from the reflected light using a photodetector (PD) 102. At this time, the objective lens 101 applies a substantially oblong optical spot 103 to the optical card 100.

The optical spot 103 is applied to three guide tracks 100a, and the reflected light thereof is passed through the objective lens 101 and forms an image on the photodetector 102. The photodetector 102 is provided with an information detecting detector portion 102a for detecting the presence of a record pit 100b on the information track 100c shown in the lower portion of the drawing, a TES detecting detector upper portion 102b for detecting the track error signal, a TES detecting detector lower portion 102c for detecting the track error signal and an information detecting detector portion 102d for detecting the presence of a record pit 100b on the information track 100c shown in the upper portion of the drawing, all of which are provided at the position where the light reflected from the optical card 100 forms an image.

The TES detecting detector upper portion 102b having an inverted triangular form and the TES detecting detector lower portion 102c having a triangular form are disposed so that one vertex of one of the detector portions coincides with one vertex of the other, and the two detector portions 102b, 102c make a pair for detecting the track error signal. Each of the TES detecting detector upper and lower portions 102b and 102c detects a density of the image of the guide track 100a, which is formed thereon, so that the difference between the density values is detected as the track error signal. The track error signal is used as a signal for tracking servo. The information on the two information tracks 100c can also be simultaneously detected by the information detecting detector portions 102a, 102d.

In a conventional optical card apparatus, the TES detecting detector upper and lower portions 120b and 102c are formed in an inverted triangle and a triangle, respectively, for stable tracking servo which is not easily deviated, thereby widening the detectable range of the track error signal.

However, in the conventional optical card apparatus, although the detectable range of the track error signal can be widened to some extent, the range is limited to about half of the track pitch (generally 12 to 20 μm). This is because if an attempt is made to widen the detectable range to a range over the limit, the TES detecting detector upper and lower portions 102b and 120c are superposed on the information detecting detector portions 102a and 102d, respectively.

In addition, when the tracking servo is deviated due to vibration or the like, and the tracking error signal is thus significantly deviated, the information pit 100b is deviated from the information detecting detector portion 102d. FIG. 3(A) shows the state wherein the tracking servo is not deviated, and FIG. 3(B) shows the state wherein the tracking servo is deviated. FIG. 4 shows the relation between the track error signal and a read signal. As shown in FIG. 3(B), during the time the track error signal is significantly deviated due to deviation of the tracking servo, the read signal cannot be obtained.

SUMMARY OF THE INVENTION

It is an object of the present invention to provide an optical information recording/reproducing apparatus which is capable of constantly stably tracking without being affected by influences of defects or dust on a record medium, vibration or the like.

It is another object of the present invention to provide an optical information recording/reproducing apparatus which enables an increase in the detectable range of a track error signal and which is capable of performing stable tracking servo without being affected by external vibration, dust or defects such as flaws or the like on a record medium.

It is still another object of the present invention to provide an optical information recording/reproducing apparatus which is capable of detecting a track error signal in accordance with the deviation of a target guide track.

It is a further object of the present invention to provide an optical information recording/reproducing apparatus which is capable of correctly tracking and reading the recorded information even in the state wherein tracking servo is deviated.

It is a still further object of the present invention to provide an optical information recording/reproducing apparatus which is capable of constantly stably detecting a track error signal while avoiding a defect or the like on a record medium.

In order to achieve the objects, the present invention provides an optical information recording/reproducing apparatus for performing at least one of recording and reproducing of information by applying an optical spot to a record medium disposed at a position to which an imaging spot of the light reflected from the record medium is applied and having a plurality of guide tracks and a plurality of information tracks, the apparatus comprising optical detection means having a plurality of optical detection portions which are disposed in a line in the direction substantially vertical to an image of the guide tracks so as to detect the reflected light by the optical detection portions and output a signal; address position specification means for specifying the address positions of a plurality of optical detection portions for scanning the optical detection means; detector output select means for selecting the output from a plurality of optical detection portions in accordance with the output from the address position specification means; detection region setting means for setting a guide track detection region having a predetermined width for detecting the guide tracks; track position detection means for detecting the address positions of the optical detection portions corresponding to at least one guide track; and track error generating means for generating a track error signal on the basis of the output from the track position detection means.

Other characteristics and advantages of the present invention will be clear from the description below.

BRIEF DESCRIPTION OF THE DRAWINGS

FIGS. 5 to 11 relate to a first embodiment of the present invention, in which:

FIG. 5 is a schematic block diagram of an optical information recording/reproducing apparatus;

FIG. 6 is an explanatory view showing the relations among an optical card, an objective lens and a line sensor;

FIG. 7 is a schematic drawing showing the configuration of an optical head;

FIG. 8 is an explanatory view showing the track error signal, obtained in the first embodiment;

FIGS. 9(a)-9(c) are explanatory view showing the relation between a window range and a guide track during introduction of tracking servo;

FIG. 10 is an explanatory view showing the relation between a window range and a guide track during tracking; and FIG. 11(a-i) is a timing chart showing the operation of the first embodiment;

FIGS. 12 to 14 relate to a second embodiment of the present invention, in which:

FIG. 12 is a schematic block diagram of an optical information recording/reproducing apparatus;

FIGS. 13(a)-13(b) are an explanatory view showing a window range and a guide track; and FIG. 14(a-j) is a timing chart showing the operation of the second embodiment; and FIGS. 15 to 18 relate to a third embodiment of the present invention, in which:

FIG. 15 is a schematic block diagram of an optical information recording/reproducing apparatus;

FIG. 16(a-k) is a timing chart showing the operation of the third embodiment;

FIG. 17 is a explanatory view explaining the movement of a window range which is caused by a defect of an optical card; and FIG. 18 is an explanatory view explaining a track error signal obtained in the third embodiment.

DETAILED DESCRIPTION OF THE PREFERRED EMBODIMENTS

FIGS. 5 to 11 show a first embodiment of the present invention.

Figure 1:
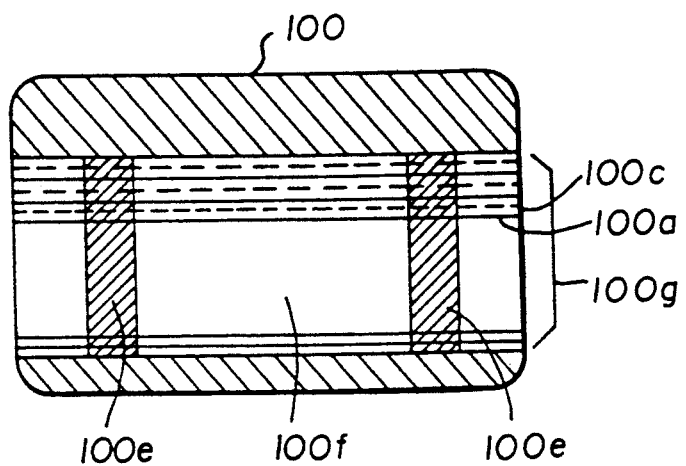
FIG. 1 is a drawing showing the configuration of an optical card of a conventional apparatus.
Figure 2:
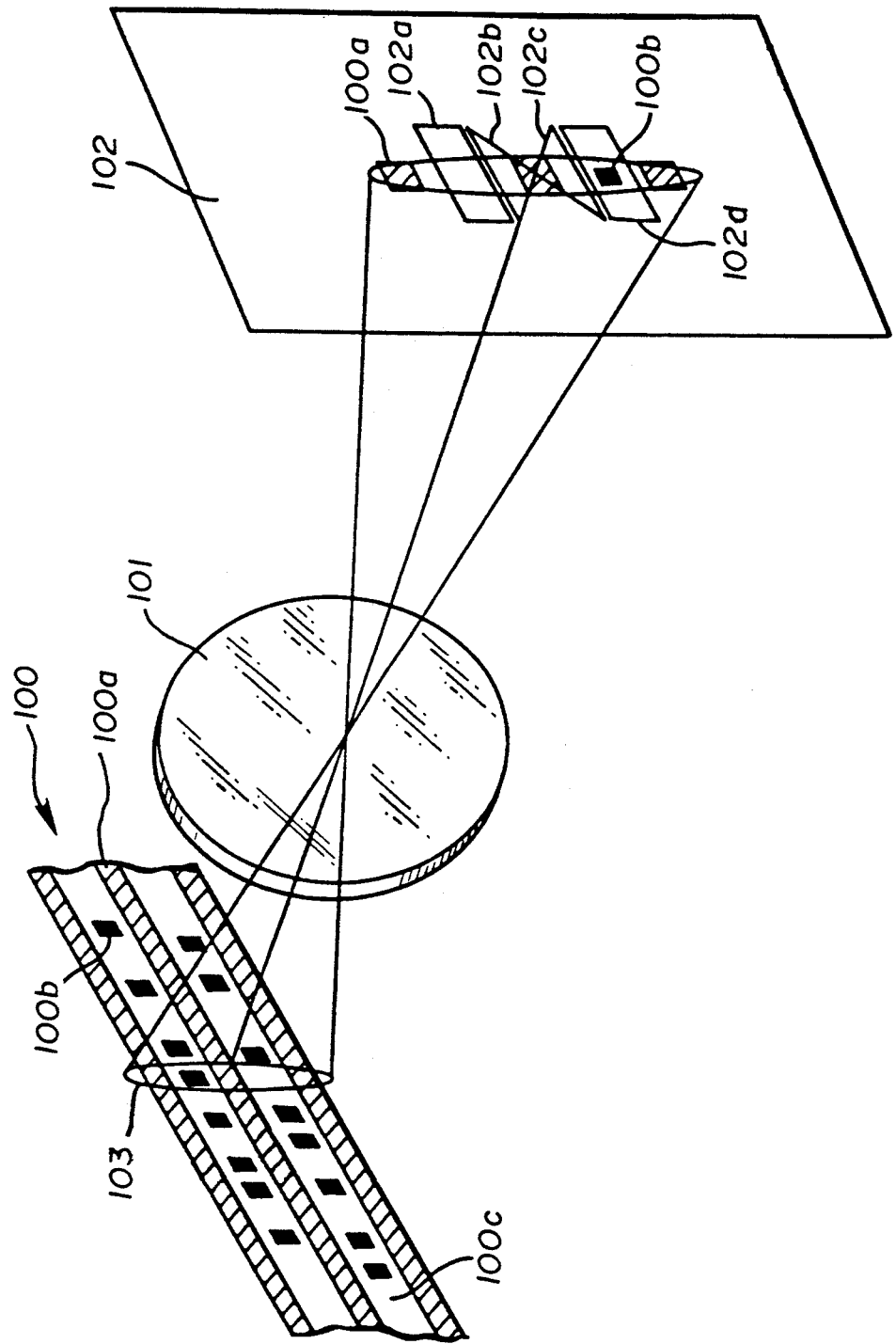
FIG. 2 is an explanatory view showing the relations among an optical card, an objective lens and an optical sensor in a conventional apparatus.
Figure 3:
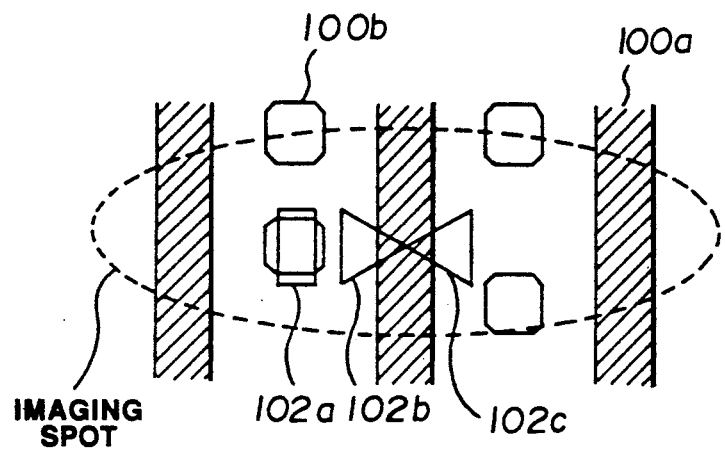
FIGS. 3(a)-3(b) are explanatory view explaining the influences of vibration or the like on tracking servo in a conventional apparatus.
Figure 3:
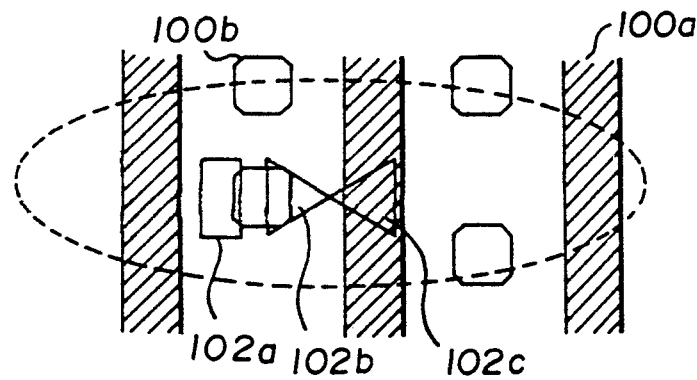
Figure 4:
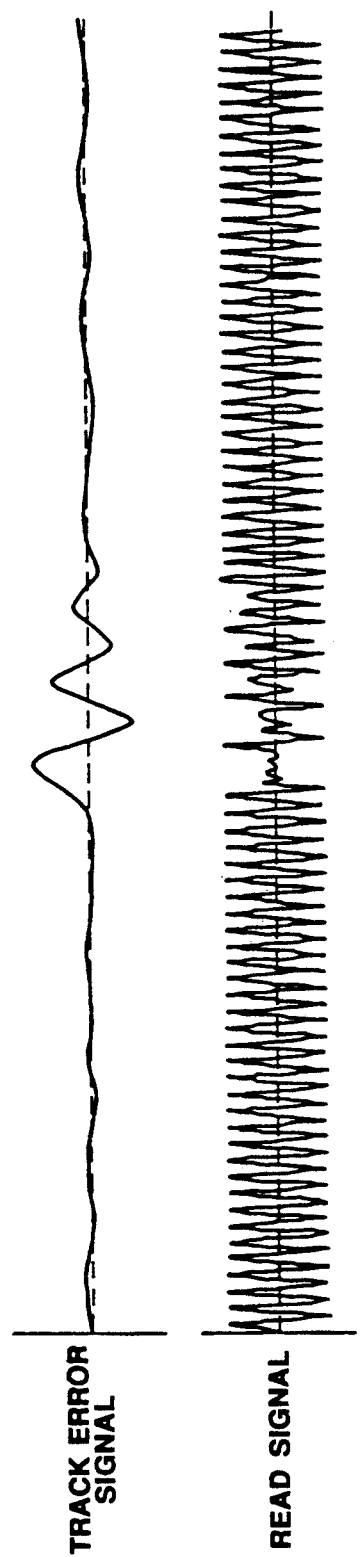
FIG. 4 is an explanatory view explaining a track error signal and a read signal in the state shown in FIG. 3.
Figure 6:
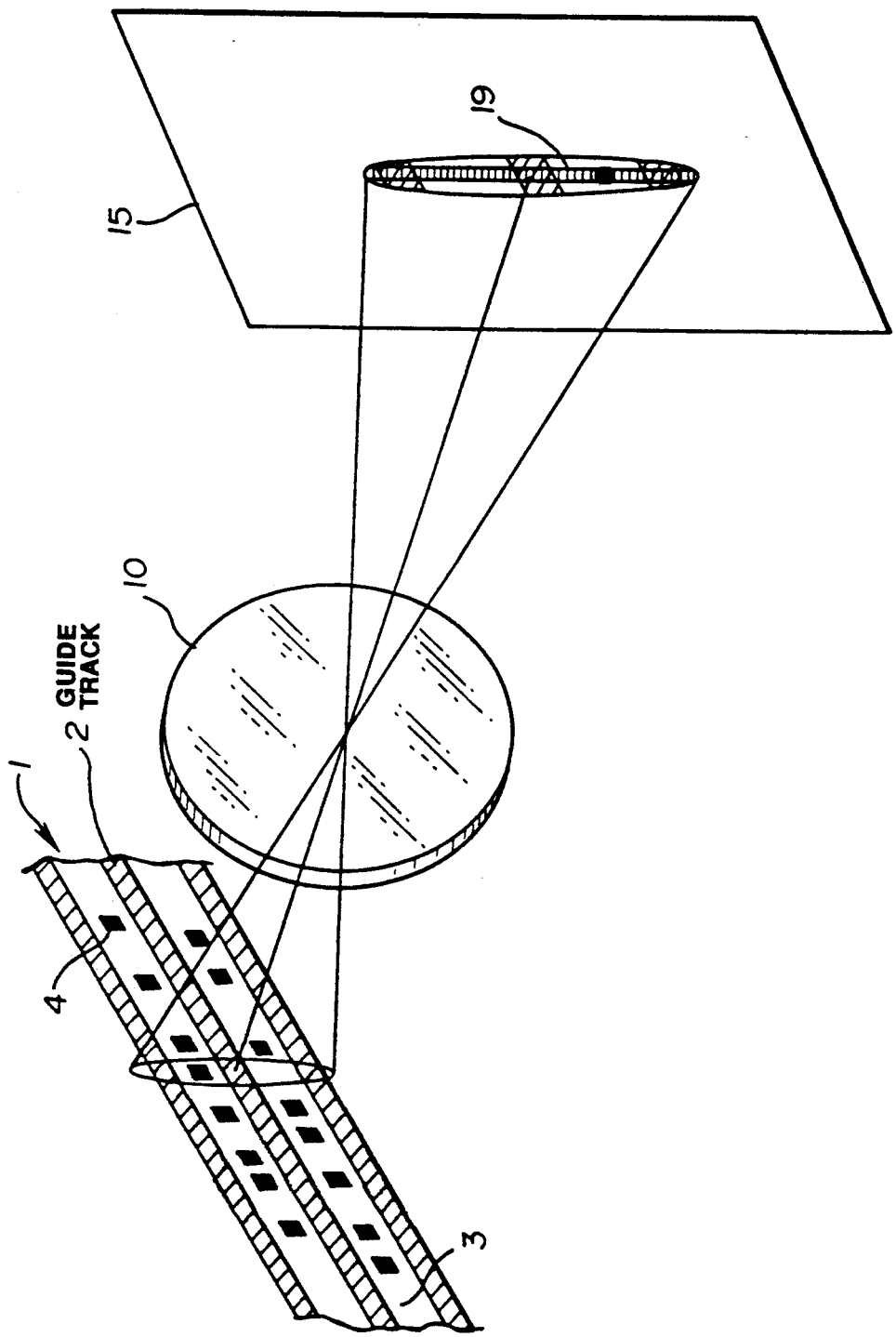

The optical card 1 shown in FIG. 6 has guide tracks 2 which are extended in the lengthwise direction thereof and information tracks 3 interposed between the respective guide tracks 2. Each of the guide tracks 2 serves as a guide for tracking of the optical spot generated from the optical head described below. On the information tracks 3 are recorded record pits 4 corresponding to modulated record information. The whole structure of the optical card 1 is as shown in FIG. 1

Figure 5:
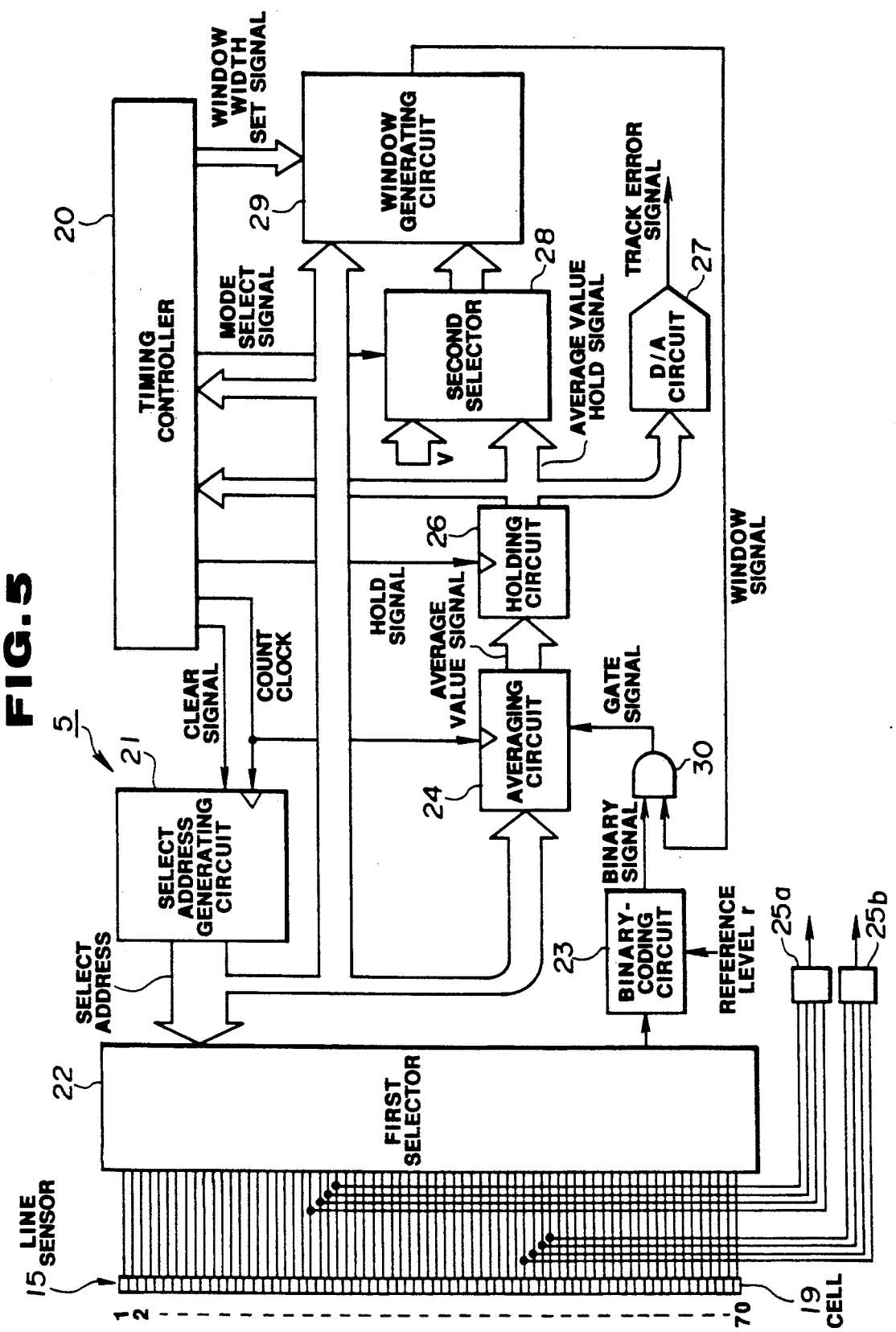
Figure 7:
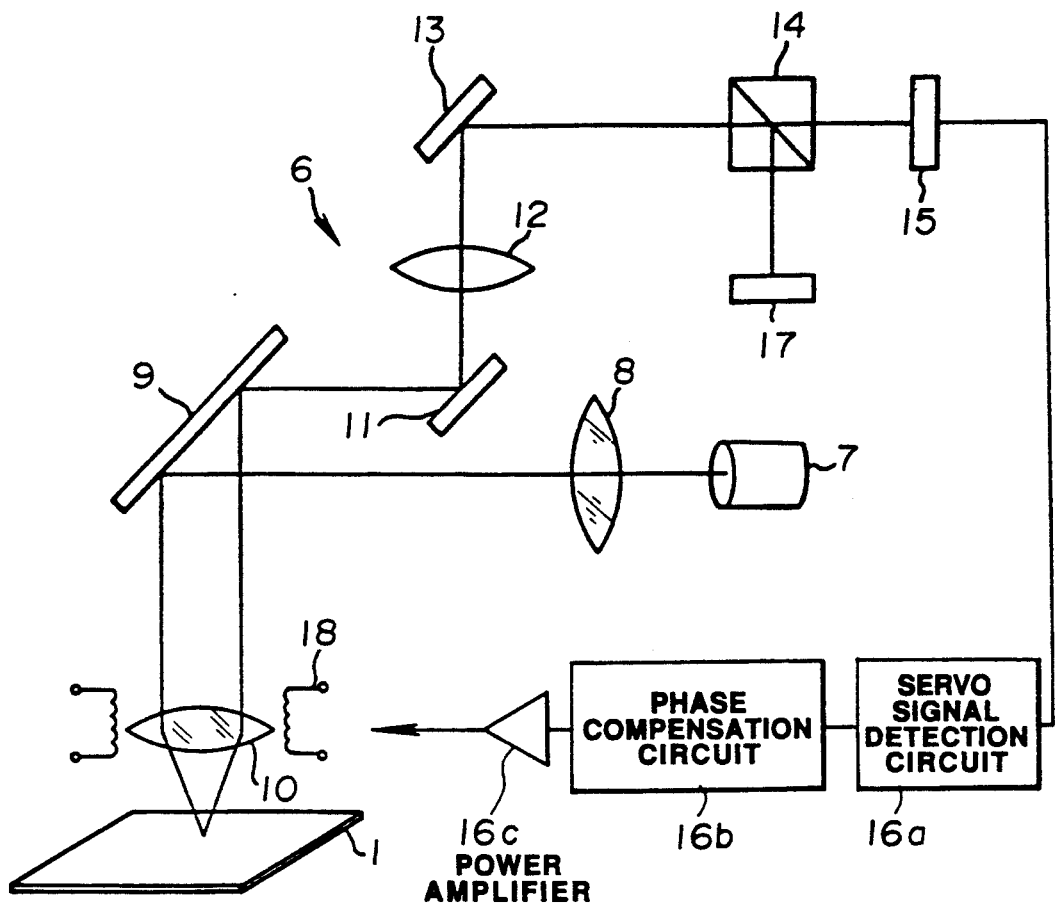

The optical card apparatus 5 shown in FIGS. 5 to 7 and serving as an optical information recording/reproducing apparatus has an optical head 6 for applying recording/reproducing light to the optical card 1. As shown in FIG. 7, the optical head 6 is designed for projecting an optical spot on the optical card 1 through a laser beam source 7 for emitting a laser beam, a collimator lens 8, a first reflecting mirror 9 and an objective lens 10. The optical head 6 is also designed so that one of the separated portions of the light reflected from the optical card 1 forms an image on a line sensor 15 serving as optical detection means for detecting the track error signal through the objective lens 10, the first reflecting mirror 9, a second reflecting mirror 11, an imaging lens 12, a third reflecting mirror 13 and a beam splitter for separating the reflected light into two portions. The optical head 6 also has a focus error detector 17 which the other portion of the reflected light separated by the beam splitter 14 enters to generate a focus error signal. The optical card apparatus 5 constantly performs focus servo so as to focus the optical spot on the basis of the focus error signal. The optical head 6 further has an actuator 18 disposed near the objective lend 10. The actuator 18 moves the objective lens 10 in the direction substantially vertical to the guide tracks 2 of the optical card 1. The detection signal of the line sensor 15 is input to a servo signal detection circuit 16a which generates a track error signal. A control signal is input to the actuator 18 through a phase compensation circuit 16b and a power amplifier 16c so as to control the actuator 18 on the basis of the track error signal.

FIG. 5 shows the detailed configuration of the line sensor 15 and the servo signal detection circuit 16a. The line sensor 15 has a plurality of cells 19, for example, 70 cells, respectively serving as optical detectors which are arranged in a line so as to respectively convert the incident light reflected from the optical card into electrical signals and output the signals. As shown in FIG. 6, each of the plurality of cells 19 forms an image of a plurality of guide tracks 2, e.g., three guide tracks 2, and the information tracks 3 interposed between the respective guide tracks 2 through the objective lens 10 (the other lens systems are not shown in the drawing). Namely, the cells 19 of the line sensor 15 are arranged in a line in the direction substantially vertical to the image of the guide tracks 2 so that the line sensor 15 can detect the positions of the guide tracks and simultaneously detect the information on the two information tracks 3.

The optical card apparatus 5 is provided with a timing controller 20 for controlling the whole apparatus 5, a select address generating circuit 21 serving as address position specification means for outputting select addresses for successively selecting the cells 19 of the line sensor 15 at each time the count clock output from the timing controller is input thereto, a first selector 22 having input terminals which are respectively connected to the cells 19 of he line sensor 15 and serving as detector output select means for selecting and outputting the signal of the cell 19 corresponding to the address output from the select address generating circuit 21, a binary coding circuit 23 for binary-coding the signal selected and output from the first selector 22, and an averaging circuit 24 to which the select address output from the select address generating circuit 21 is input with the timing of the counter clock so as to calculate and output the average address value during the time the gate signal described below is input thereto.

The first selector 22 receives the addresses output from the select address generating circuit 21 and successively scans the cells, for example, from cell 1 to cell 70, i.e., successively selects and outputs the output signals for one scan. The binary-coding circuit 23 is activated when the signal output from the selected cell 19 is higher than a reference level r. In the record medium of this embodiment, since the reflectance of the guide track portions is different from that of the track portions, the reference level r is set so that only the signals reflected from the guide track portions are fetched.

The optical card apparatus 5 is also provided with an adder 25a to which the signals respectively output from a plurality of predetermined cells of the cells 19, for example, cell Nos. 22 to 25 (read cells 19a), are input so as to add the signals, and an adder 25b to which the signals respectively output from cell Nos. 46 to 49 (read cells 19b) are input so as to add the signals. The adders 25a, 25b respectively output as information signals the presence of a record pit 4 on the two information tracks 3 to which the optical spot is applied.

The optical card apparatus 5 is further provided with a holding circuit 26 for holding the average address value signal output from the averaging circuit 24 during one scan on the basis of the hold signal output from the timing controller 20 and for outputting the the average value hold signal, a digital/analog (D/A) circuit 27 for digital/analog conversion of the average value hold signal output from the holding circuit 26 and outputting the converted signal as a track error signal, and a second selector 28 for selecting one of the average value hold signal output from the holding circuit 26 and the central address V set at a predetermined value in accordance with the mode select signal output from the timing controller 20 and for outputting a central (reference) address signal. The timing controller 20 recognizes one period of scan from the address output from the select address generating circuit 21 so as to control the hold signal.

The optical card apparatus 5 further comprises a window generating circuit 29 serving as detection region setting means for activating a window signal using the window width set signal set by the timing controller 20, the select address output from the select address generating circuit 20 and the central address signal selected by the second selector and used as a reference. For example, the window signal is activated only when the select address is within the range having the central address at the center and a predetermined window width (guide track detectable region) output from the timing controller 20.

The optical card apparatus 5 further comprises an AND gate 30 for calculating AND of the window signal output from the window generating circuit 29 and having a predetermined width and the binary signal output from the binary-coding circuit 23. The AND gate 30 outputs a gate signal to the averaging circuit 24 to which the select address is input during the time the gate signal is active to determine an average value. The binary-coding circuit 23, the averaging circuit 24 and the AND gate 30 constitute track position detection means.

When tracking servo is introduced, the second selector 28 selects the fixed central address V, for example, the address value corresponding to the center of the cells 19 of the line sensor 15, and outputs the address value as the central address signal.

The averaging circuit 24 renews the average value for each scan in accordance with the relative positional relation between the objective lens 10 and the guide tracks 2. For example, if the relative positional relation between the objective lens 10 and the guide tracks 2 is deviated, the signal output from the holding circuit 26 is also changed in response to the deviation. During the usual tracking servo operation, the second selector 28 thus outputs the central address obtained by the preceding one scan in accordance with the change in the relative position between the objective lens 10 and the guide track 2 shown in FIG. 6.

During the usual tracking servo operation, the window generating circuit 29 thus outputs the window signal having a window width with the central address obtained by the preceding one scan at the center thereof in accordance with the change in the relative position between the objective lens 10 and the guide tracks 2 so that a guide track 2 is constantly at the center of the window width in accordance with the change in the relative position between the objective lens 10 and the guide tracks 2. The AND gate 30 activates the gate signal when the output from the binary-coding circuit 23 is activated by the cell 19 forming an image of the guide tracks 2 and when the output from the window generating circuit 29 is active.

The function of this embodiment to detect the track error signal is described below with reference to FIG. 5 and FIGS. 8 to 11.

Since there are two types of detection of the track error signal, i.e., the detection during introduction of tracking servo and the detection during usual tracking servo after the tracking servo is completely introduced, the two types are described below in turn.

The detection of the track error signal during introduction of tracking servo, i.e., the initial operation in this embodiment, is described below. In this case, the initial positions of the guide tracks on the line sensor 15 are unstable.

The signal output from the cell 19 corresponding to the address specified by the first selector 22 is selected from the signals output from the cells 19 (Nos. 1 to 70) of the line sensor 15 and is input to the binary-coding circuit 23. The select address generating circuit 21 counts up the count clock shown in FIG. 11(b) output from the timing controller 20 to generate the select addresses (Nos. 1 to 70) shown in FIG. 11(a) for successively selecting the cells 19 of the line sensor 15. When all the cells 19 of the line sensor 15 are scanned, the timing controller 20 recognizes the period of one scan by the address output from the select address generating circuit 21 to output the clear signal shown in FIG. 11(c). When the select address generating circuit 21 receives the clear signal at the end of one scan, the circuit 21 clears the address and again counts up the address from "1". Thus the cells 19 of the line sensor 15 are successively scanned, and the binary-coding circuit 23 compares the signal output from the selected cell 19 with the reference level r to generate a binary signal which is then output to the AND gate 30.

The second selector 28 selects the central address V on the basis of the mode select signal output from the timing controller 20 and outputs the address V to the window generating circuit 29. Namely, during the introduction of tracking servo, the mode select signal for selecting the central address V is output. The window generating circuit 29 activates the window signal using the window width set signal set by the timing controller, the select address output from the select address generating circuit 21 and the central address V output from the second selector 28 only when the select address is within the range having the central address V at the center thereof and the window width set by the timing controller 20. In this case, the central address V is set at the address at the center of the line sensor 15, and the window width is a value used during the introduction of tracking servo. The window width during the servo retract is, for example, the range corresponding to 18 cells of the cells 19, as shown by a portion hatched by points in FIG. 9.

The AND gate 30 calculates AND of the binary signal output from the binary-coding circuit 23 add the window signal output from the window generating circuit 29 and inputs the AND as the gate signal to the averaging circuit 24. The gate signal output from the AND gate 30 is active only when the binary signal output from the binary-coding circuit 23 is activated by the signal output from the cell 19 which forms an image of the guide tracks 2 and when the window signal output from the window generating circuit 29 is active.

The averaging circuit 24 calculates the average of the select address values output from the select address generating circuit 21 only during the time the gate signal is active, and outputs the average value signal to the holding circuit 26. Namely, the average value of the select address values corresponding to the cells 19 when the gate signal is active is calculated and output as the average value signal. The timing controller 20 outputs the hold signal at the end of one scan of the line sensor 15. When the holding circuit 26 receives the hold signal, the holding circuit 26 holds the address average value signal output from the averaging circuit 24 and outputs the average value hold signal to the A/D circuit 27 and the second selector 28. The average value hold signal is also output to the timing controller 20. The A/D circuit 27 converts the average value hold signal into an analog signal and outputs it as the track error signal. The actuator 28 is controlled on the basis of the track error signal so as to drive the objective lens 10.

Figure 8:
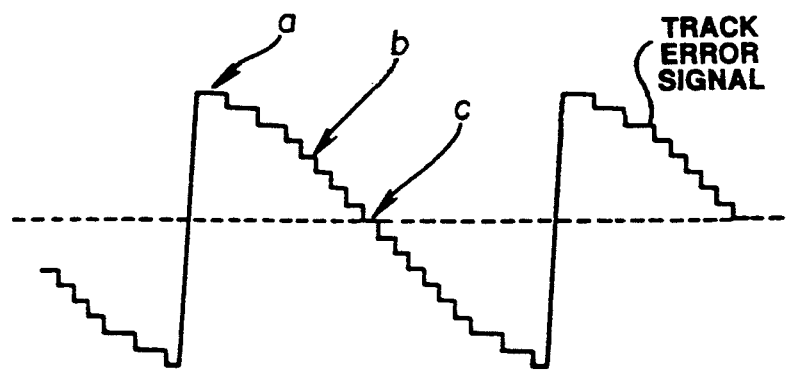
Figure 9:
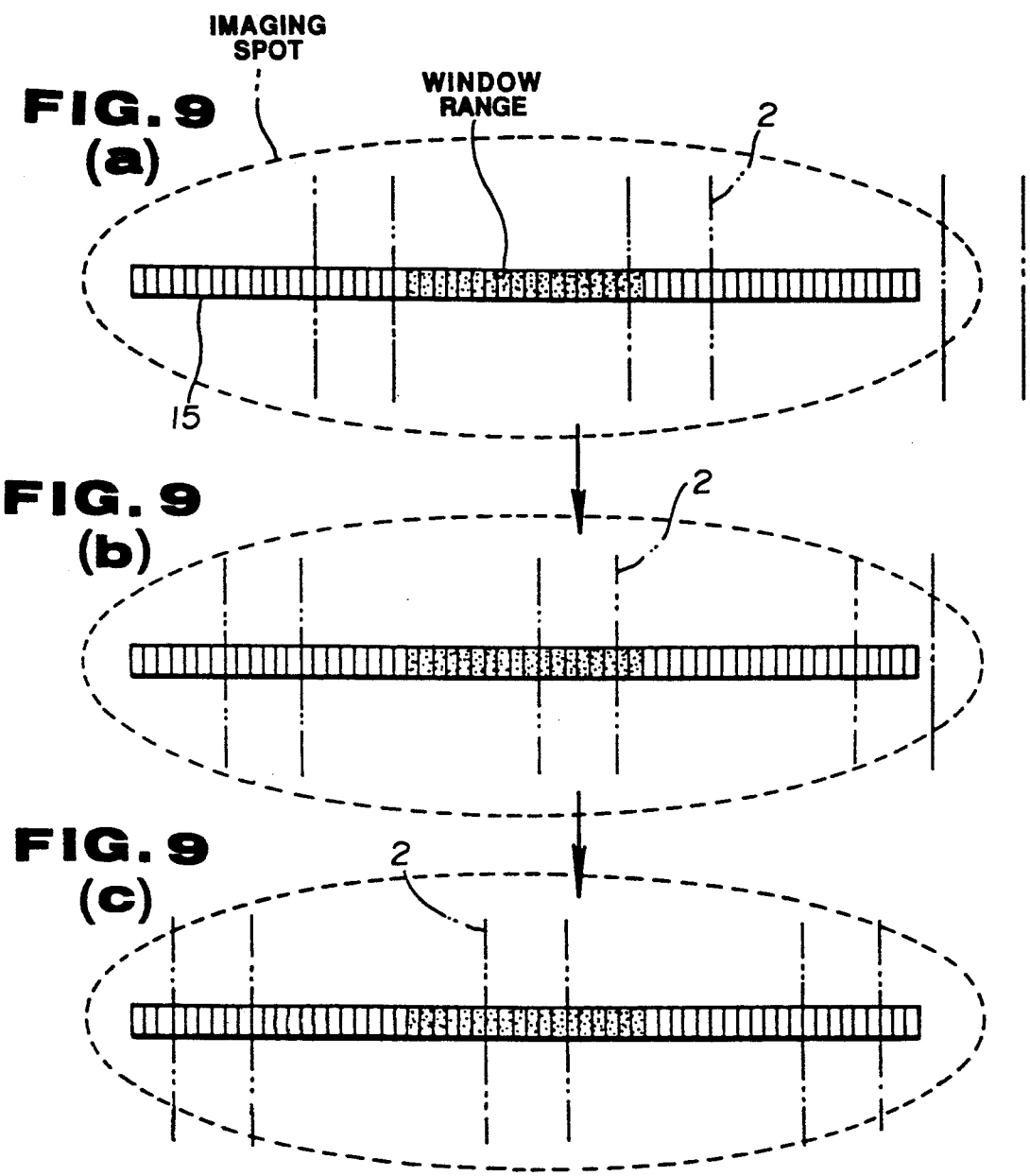

FIG. 9 shows the relation between the line sensor 15 and the guide tracks 2 when the servo is introduced. The tracking servo is introduced in a portion without the record pits 4, for example, in the unrecorded information track 3 or the region outside the ID portion. The tracking servo is introduced in the order of FIGS. 9(a), 9(b), 9(c), and FIG. 9(c) shows the state wherein the tracking servo is completely introduced and the target guide track 2 is placed at substantially the center of the window range. FIG. 8 shows changes in the track error signal when an image of the guide tracks 2 is moved on the line sensor 15 during the introduction of the tracking servo. In the drawing, arrows a, b and c respectively correspond to the FIGS. 9(a), 9(b) and 9(c). As shown in FIG. 9(a), the guide track 2 for which the servo is introduced is placed at the rightmost position of the window range, the signal output from the A/D circuit 27 is the peak value shown by the arrow a in FIG. 8. When the guide track 2 is slightly moved to the right, as shown in FIG. 9(b), the output signal is the value shown by the arrow b in FIG. 8. When the guide track 2 is at the center of the window range, as shown in FIG. 9(c), the output signal is the predetermined reference level corresponding to the central address V, i.e., the on-track state is established. The tracking servo can be introduced regardless of the initial position of the image of the guide track 2 formed on the line sensor 15.

The operation of detecting the track error signal in the usual tracking state after the servo is introduced is described below. The state where the servo is introduced is transferred to the usual tracking state with such timing that a predetermined time passes for stabilizing the servo after the average value hold signal output from the holding circuit 26 and read by the timing controller 20 becomes the value shown by the arrow c in FIG. 8, i.e., after the target guide track is placed at the center. When it is decided that the state of servo introduction is transferred to the usual tracking state, the mode select signal is switched.

Like during the time the servo is introduced, the first selector 22 outputs the signals output from the cells 19 of the line sensor 15 which are successively scanned to the binary-coding circuit 23 which binary-codes the signals output from the cells 19 successively scanned and outputs the signals to the AND gate 30.

During tracking, the second selector 28 selects as the central address the average value hold signal output from the holding circuit 26 on the basis of the mode select signal output from the timing controller 20 and outputs the central address to the window generating circuit 29. The window generating circuit 29 activates the window signal by using the window width set signal set by the timing controller 20, the select address output from the select address generating circuit 21 and the central address selected by the second selector 28 and output from the holding circuit 26 only when the select address is within the range having the central address at the center thereof and the window width set by the timing controller 20, as shown in FIG. 10(d). At this time, the central address is the average value hold signal and shows the central position of the guide track set one scan before.

The window width is a value for tracking. The window width during tracking is the point-hatched range shown in FIG. 10, for example, corresponding to 14 cells of the cells 19. Namely, the window width during the introduction of the servo is set to a value greater than that during tracking. During tracking, the read cells 19a, 19b each comprising a plurality of cells are respectively placed at positions which allow the reading of the record pits 4, and the adders 25a, 25b respectively add the signals output from the read cells 19a, 19b and output the read signals, thereby reproducing information.

The AND gate 30 calculates the AND of the binary signal output from the binary-coding circuit 23 and the window signal output from the window generating circuit 29 and inputs the AND as the gate signal shown in FIG. 11(f) to the averaging circuit 24. In the AND gate 30, the output from the binary-coding circuit 23 is activated by the signal output in the state where one of the cells forms an image of the guide tracks 2, and the gate signal output is active only when the window signal output from the window generating circuit 29 is active.

Figure 10:
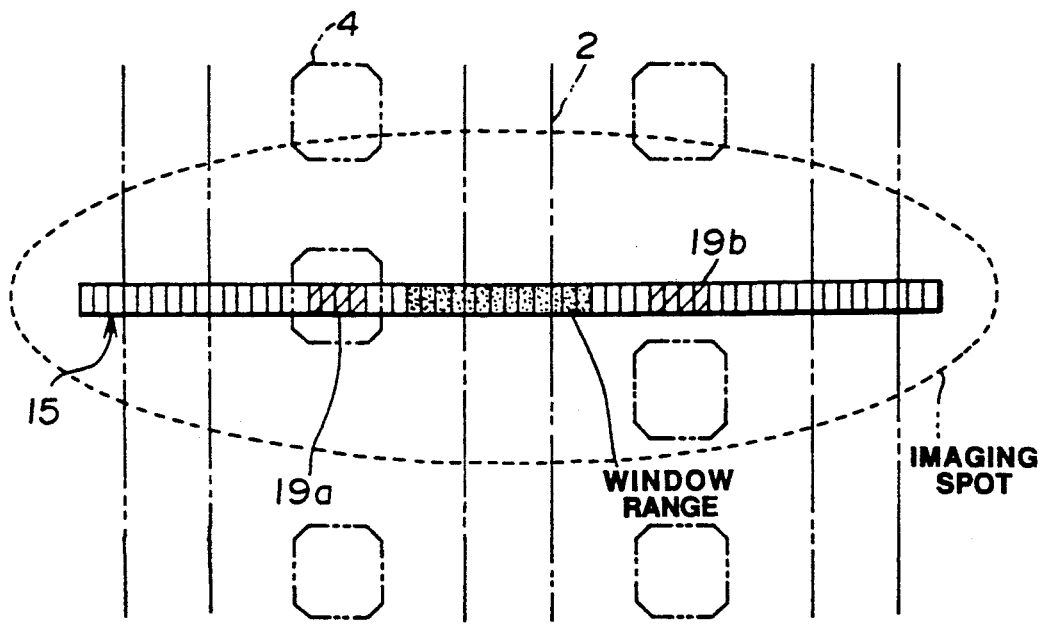
Figure 11:
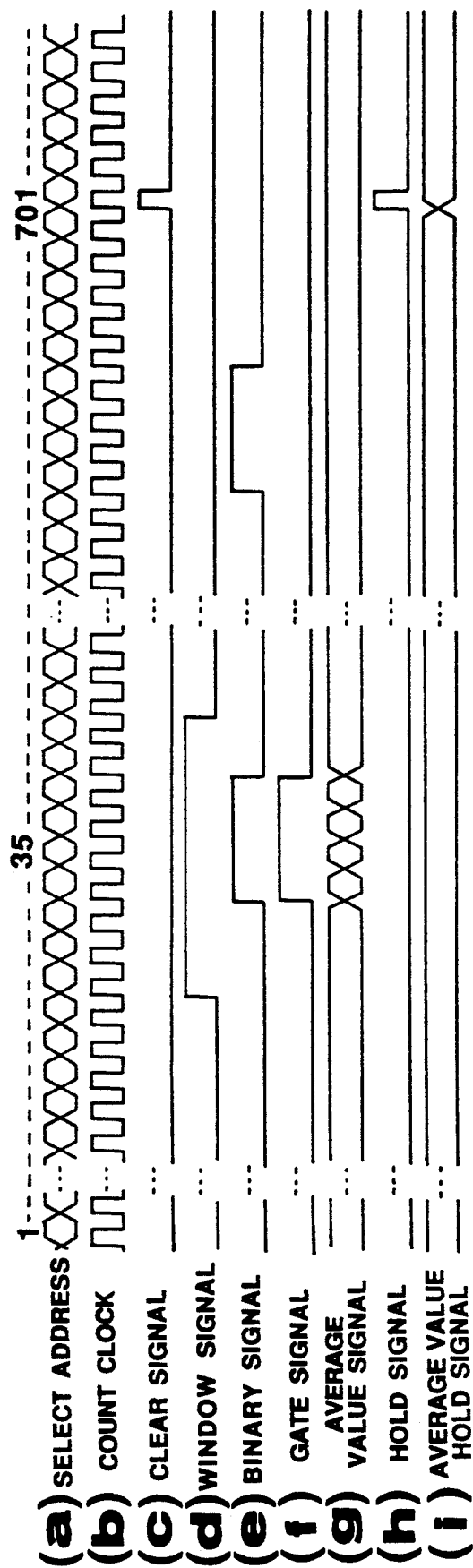

The averaging circuit 24 calculates the average of the select address values output from the select address generating circuit 21 only during the time the gate signal is active and outputs the average value signal shown in FIG. 11(g) to the holding circuit 26. The timing controller 20 outputs the hold signal shown in FIG. 11(h) and output at the end of one scan of the line sensor 15. The holding circuit 26 holds the address average value signal output from the averaging circuit 24 during one scan on the basis of the hold signal and outputs the average value hold signal shown in FIG. 11(i) to the D/A circuit 27 and the second selector 28. The D/A circuit 27 converts the average hold signal into an analog signal and outputs it as the track error signal. FIG. 10 shows the relation between the line sensor 15 and the guide tracks 2 during tracking. During tracking, the window range is a range for detecting the guide tracks 2 which is set at a position kept away from the record pits 4 so as not to be affected by the record pits 4.

When the position of the guide track 2 shown in FIG. 10 is shifted to the left for a length, for example, corresponding to one cell 19, the second selector 28 outputs, during the next scan, the central address which is shifted from the before central address by one, and the window generating circuit 29 activates the window signal having a window width and the shifted central address at the center thereof and outputs the signal. Since the AND gate 30 activates the gate signal by the active binary signal and the active window signal, the position of the guide track is detected by the window range set one scan before to generate the track error signal.

In the first embodiment, since the gate is opened on the basis of the window range set one scan before so as to determine the average value of the select address, if the target guide track 2 is deviated from the central position of servo introduction due to defects or dust on the optical card 1 or vibration, the window range is also shifted in accordance with the deviation of the central position. It is thus possible to detect the track error signal within a range which is permitted by the sizes of the imaging spot and of the line sensor 15, without any influences of defects or dust on the optical card 1 or vibration and any influences of the record pits 4 and the adjacent guide tracks 2, as described above. In addition, since the time for scanning the line sensor 15 is set to a value (for example, about 100 μsec) sufficiently smaller than the tracking speed of the tracking servo, the change (deviation) of a guide track which is caused by a defect or dust on the optical card 1 or vibration can be substantially neglected, and the window range can be securely set in accordance with such a deviation, thereby increasing the detectable range of the track error signal.

It is thus possible to significantly widen the detectable range of the track error signal and perform stable tracking servo which is hardly affected by external vibration, dust or a defect such as a flaw or the like on the record medium.

Although the first embodiment uses the line sensor 15 comprising a plurality of cells 19 each of which outputs a signal, the line sensor is not limited to this, and a self-transfer type line sensor such as a CCD line sensor the like can be used.

Figure 12:
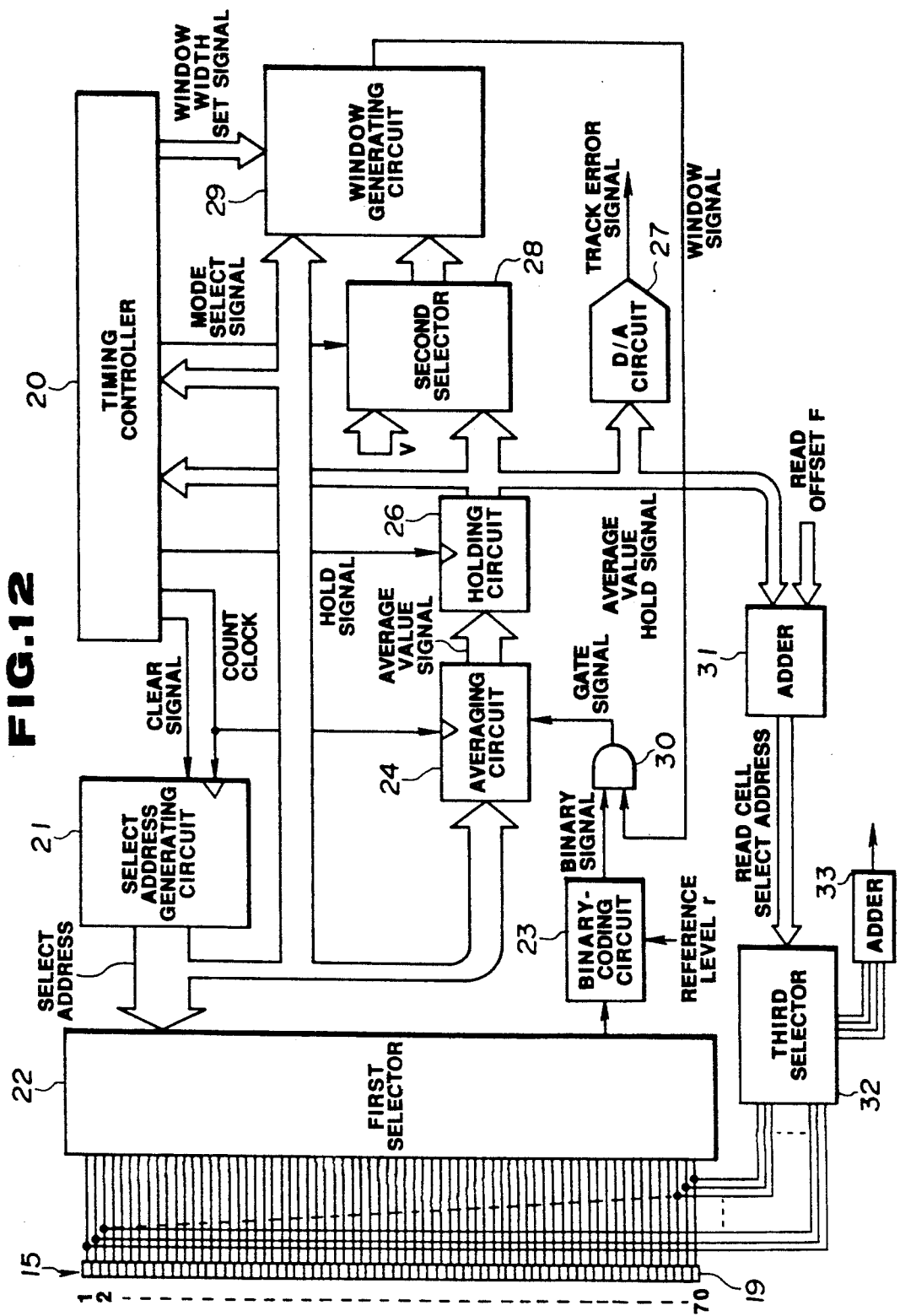
Figure 13:
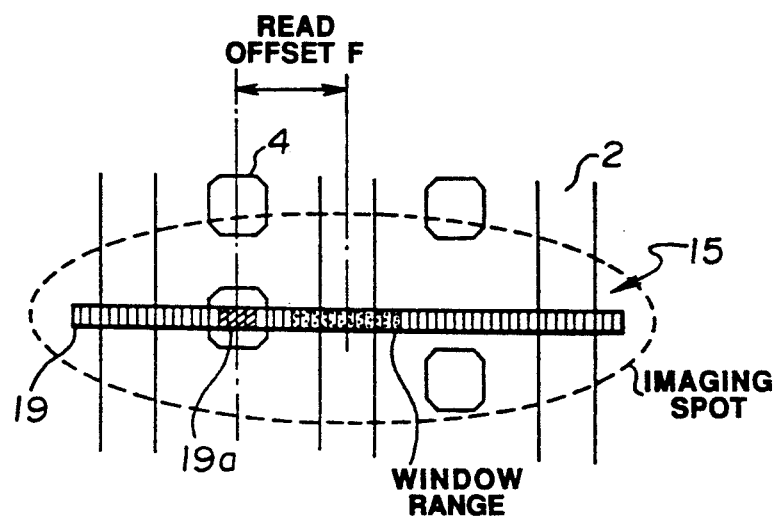
Figure 13:
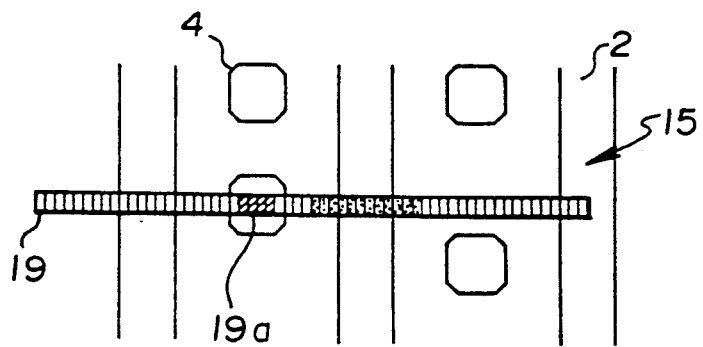
Figure 14:
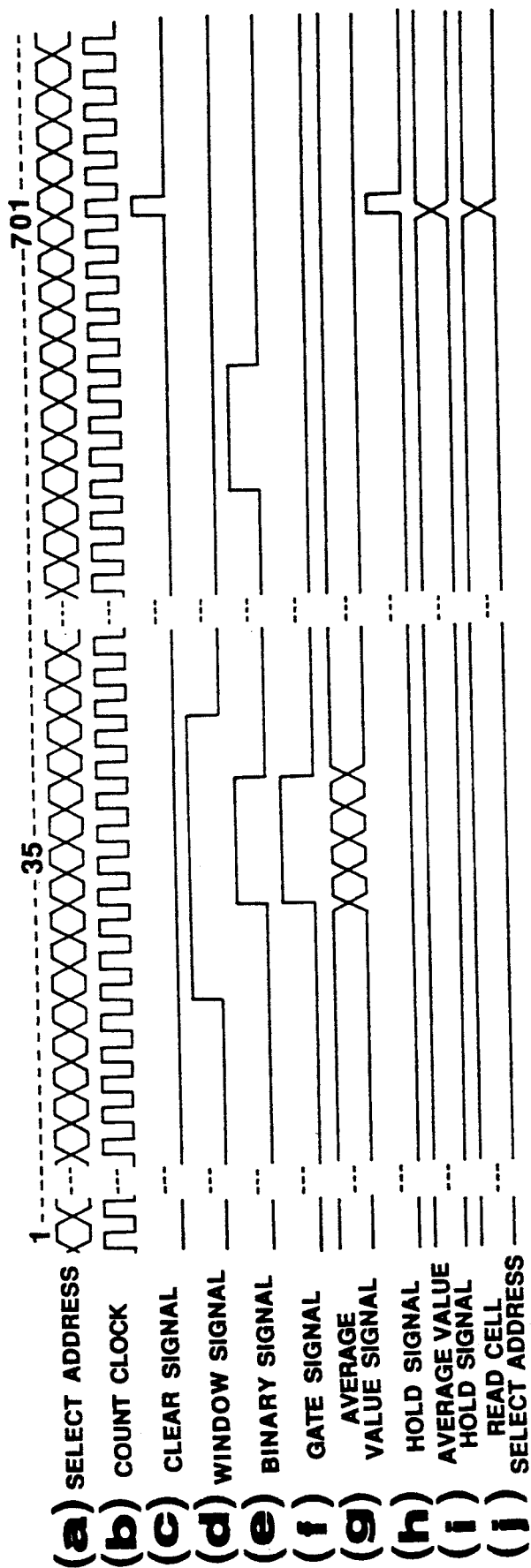

FIGS. 12 to 14 shows a second embodiment of the present invention.

Since the second embodiment has substantially the same configuration as that of the first embodiment, different portions only are described below, and the same portions are denoted by the same reference numerals and are not described below.

As shown in FIG. 12, an optical information recording/reproducing apparatus in accordance with the second embodiment comprises an adder 31 for adding the average value hold signal output from the holding circuit 26 to the read offset F described below, a third selector 32 connected to all cells 19 of the line selector 15 so as to select four continuous cells on the basis of the read select address output from the adder 31, and an adder 32 for adding the output from the four cells selected by the third selector 32.

The read offset F shows the number of cells in a portion ranging from the center of a guide track 2 within the window region to the center of a record pit 4, as shown in FIG. 13(A).

The other arrangement is the same as that in the first embodiment.

In the optical information recording/reproducing apparatus in accordance with the second embodiment configured as described above, the average value hold signal output from the holding circuit 26 is added to the read offset F by the adder 31. The read select address output from the adder 31 is output to the third selector 32 so that the third selector 32 selects four continuous cells 19 at an information pit corresponding to the guide track under tracking. The output from the four continuous cells 19 selected by the third selector 32 are added by the adder 33 and output as a read signal. The read select address (j) is output with the same timing as that of the average value hold signal (i), as shown in FIG. 14.

Namely, as shown in FIG. 13, the relation between the line sensor 15 and the guide tracks 2 during usual tracking servo includes the relation in the state (FIG. 13(A)) wherein the tracking servo is not deviated and the relation in the state (FIG. 13(B)) wherein the tracking servo is deviated due to a defect or the like. Even in the state wherein the tracking servo is deviated, the window range of the line sensor 15 is moved while avoiding the information pits 4 so as not to be affected by the information pits 4, and the read cells 19a are also moved to a position for a length corresponding to the read offset F, accompanying the movement of the window range. This causes the read signal output from the adder 33 to be made correct output. Since the time for scanning the line sensor 15 is set to a value sufficiently smaller than that of the tracking speed of the tracking servo, as described above, the deviation caused by vibration or the like during one scan can be neglected, and the window range and the read cells can securely follow the tracking servo.

Since the window range and the read cells 19a of the line sensor 15 are moved accompanying the deviation of the tracking servo, it is possible to accurately track within the region which is allowed by the line sensor 15 and to accurately read the information pits 4.

Although, in this embodiment, the read signal reads information on only one track at one time, information on a plurality of tracks may be simultaneously read. In addition, although the track error signal and the read signal are detected by the same sensor, the signals may be detected by separate sensors.

The other functions and effects of the second embodiment are the same as those of the first embodiment.

FIGS. 15 to 18 show a third embodiment of the present invention.

The configuration of the third embodiment is substantially the same as that of the first embodiment. Different portions only are described below, and the same portions are denoted by the same reference numerals as those in the first embodiment and are not described below.

Figure 15:
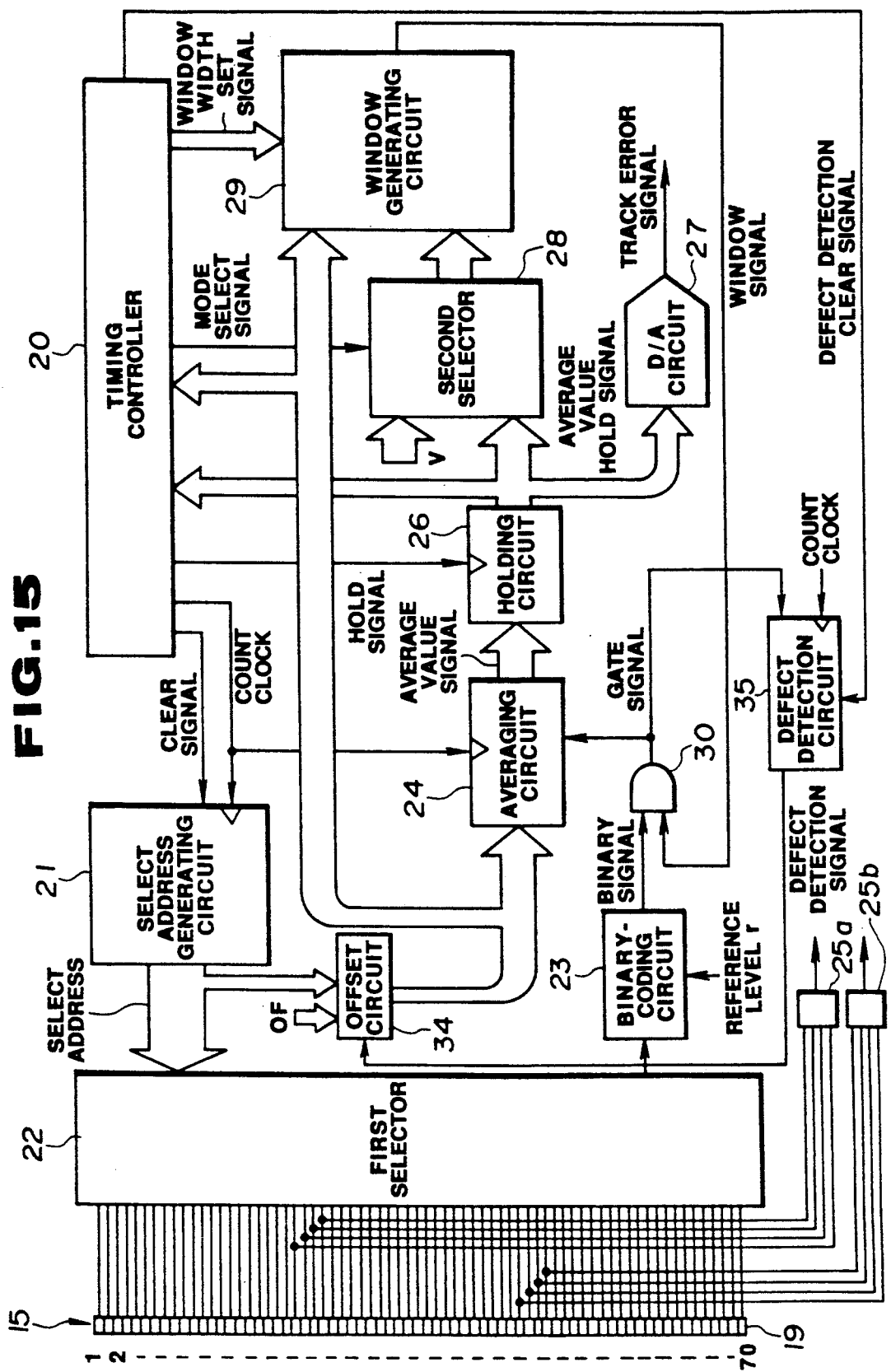
Figure 16:
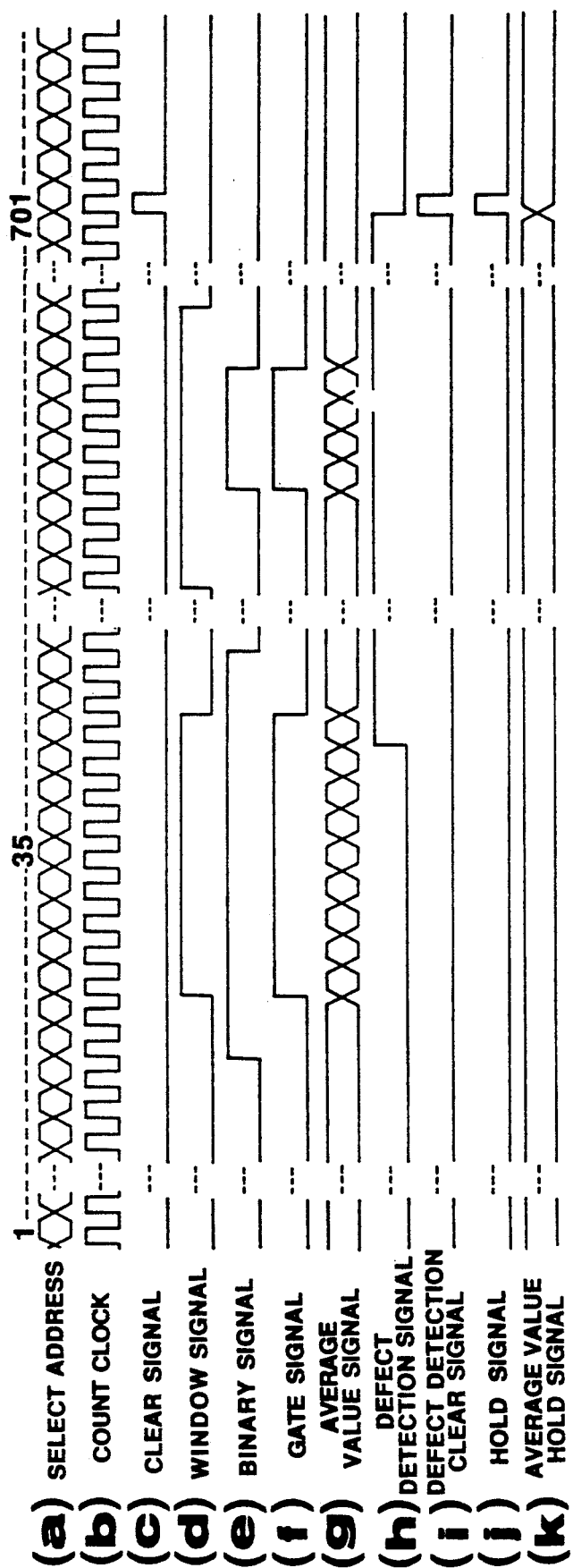

As shown in FIG. 15, an optical information recording/reproducing apparatus in accordance with the third embodiment comprises a defect detection circuit 35 for detecting the width of a guide track 2 by measuring the period in which the gate signal output from the AND gate 30 is active using the count clock and, when the detected width is beyond (greater or smaller) a predetermined range, deciding that there is dust or a defect such as a flaw on the guide tracks 2, or that the guide tacks 2 are cut and outputting a defect detection signal. The defect detection signal is cleared by the defect detection clear signal output from the timing controller 20 at the end of one scan of the line sensor 15.

The apparatus also comprises an offset circuit for outputting the address obtained by subtracting the predetermined offset value OF described below from the select address output from the select address generating circuit 21 to the timing controller 20, the average value circuit 24 and the window generating circuit 29 when the defect detection signal is active, and outputting the select address when the defect detection signal is not active.

The predetermined offset value OF is set to a value within a range which is an integral multiple (for example, n times) of the pitch between the guide tracks and which is not wider than the width of the line sensor 15. The predetermined offset value OF set as described above causes a window signal to be generated for the guide track separated from the guide track concerned by n pitches and the track error signal to be obtained for that guide track.

The other arrangement is the same as that of the first embodiment.

In the optical information recording/reproducing apparatus according to the third embodiment configured as described above, as shown in FIG. 16, the gate signal (i) is output during a predetermined time or more when the window signal (d) is active during one scan of the line sensor 15, and, when the defect detection signal (h) is output, the window signal (d) is again activated in the latter stage of the same scanning period, and the window range is moved so that the track error signal is detected in a normal guide track portion.

Figure 17:
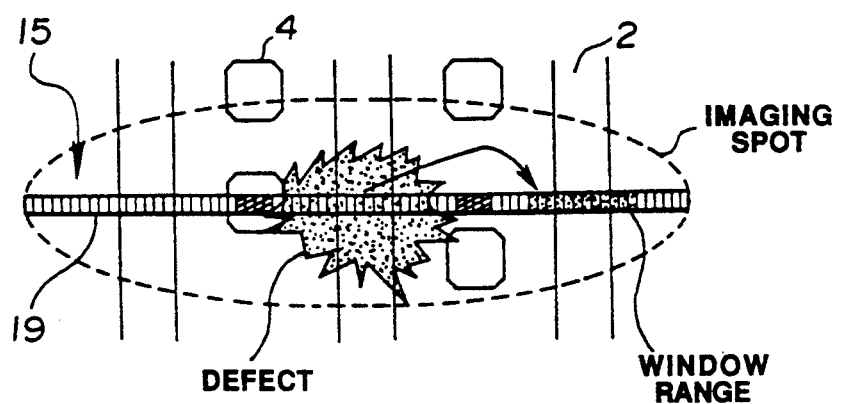

Namely, as shown in FIG. 17, when a defect is present on a guide track 2, the window range is moved to, for example, the adjacent guide track (in this case, n=1) so that the track error signal is detected in a normal guide track. In this case, the track error signal is as shown by a solid line in FIG. 18. In a conventional apparatus, the tracking servo is unstable due to the track error signal deviated by a defect or the like, as shown by a dotted line in FIG. 18. However, in this embodiment, the tracking servo can be stabilized without being affected by defects or the like.

In this way, the optical information recording/reproducing apparatus of the third embodiment is capable of detecting a defect or the like by detecting the width of a guide track and constantly obtaining a stable track error signal by obtaining the track error signal in another separate guide track when a defect is detected.

The other functions and effects are the same as those of the first embodiment.

It is clear that different embodiments can be made within a wide range on the basis of the invention without deviating from the range of the spirit and the scope of the invention. The present invention is limited by the accompanied claims and is not limited to particular embodiments.

What is claimed is:

1. An optical information recording/reproducing apparatus for performing at least one of recording and reproducing of information by applying an optical spot to a record medium having a plurality of guide tracks and a plurality of information tracks, said apparatus comprising:

optical detection means which is disposed at a position to which an imaging spot of the light reflected from said record medium is applied and which has a plurality of optical detection portions arranged in a line in the direction vertical to an image of said guide tracks so as to detect the reflected light by said optical detection portions and output a signal;

address position specification means for specifying address positions of said plurality of optical detection portions for scanning said optical detection means;

detector output selecting means for selecting the output of said plurality of optical detection portions in accordance with an output from said address position specification means;

detection region setting means for setting a guide track detection region having a predetermined width for detecting said guide tracks;

track position detection means for detecting the address positions of said optical detection portions corresponding to the position of at least one guide track on the basis of an output from said detector output selecting means and said detection region setting means; and track error generating means for generating a track error signal on the basis of the output from said track position detection means.

2. An optical information recording/reproducing apparatus according to claim 1, wherein said detection region setting means sets said guide track detection region having a center at a predetermined central position in said plurality of optical detection portions so that said track position detection means detects the address positions of said optical detection portions corresponding to the position of a guide track on the basis of the output from said guide track detection region and said detector output selecting means.

3. An optical information recording/reproducing apparatus according to claim 2, further comprising:

holding means for holding the address positions of said optical detection portions corresponding to the position of said guide track detected by said track position detection means for the period of one scan of said optical detection means so that said detection region setting means sets said guide track detection region using as said predetermined central position the address position corresponding to the position of the guide track held by said holding means one scan before.

4. An optical information recording/reproducing apparatus according to claim 2, wherein said detection region setting means sets said guide track detection region using as said predetermined central position the central address of said plurality of optical detection portions.

5. An optical information recording/reproducing apparatus according to claim 2, further comprising:

holding means for holding the address positions of said optical detection portions corresponding to the position of said guide track detected by said track position detecting means for the period of one scan of said optical detection means; and central position selecting means for selecting as said predetermined central position the central address of said plurality of optical detection portions during introduction of tracking servo and for selecting the address position corresponding the position of the guide track held by said holding means one scan before after the introduction of tracking servo is completed;

wherein said detection region setting means sets said guide track detection region having a predetermined width and the central position of the output from said central position selecting means at the center thereof.

6. An optical information recording/reproducing apparatus according to claim 5, wherein said guide track detection region set by said detection region setting means during introduction of tracking servo is wider than that set after the introduction of tracking servo is completed.

7. An optical information recording/reproducing apparatus according to claim 1, wherein said track position detecting means comprising:

binary-coding means for binary-coding the output from said detector output selecting means; and averaging means for determining the average value of the address positions of said plurality of detection portions specified by said address position specifying means when the output from said binary-coding means is active.

8. An optical information recording/reproducing apparatus according to claim 1, further comprising:

defect detection means for detecting the width of the guide track detected by said track position detection means and for outputting a defect detection signal showing the presence of a defect on a record medium when the width of said track is beyond a predetermined range; and detection track changing means for changing a guide track to be detected by said track position detection means when a defect detection signal is output from said defect detection means.

9. An optical information recording/reproducing apparatus according to claim 8, wherein said detection track changing means includes offset means for offsetting the address positions of a plurality of optical detection portions specified by said address position specifying means by a predetermined offset value.

10. An optical information recording/reproducing apparatus according to claim 9, wherein the predetermined offset value used in said offset means is an integer multiple of the distance between guide tracks on said record medium.

11. An optical information recording/reproducing apparatus according to claim 1, further comprising information detection means for detecting the record information recorded on information tracks on said record medium on the basis of the output of predetermined address positions in said plurality of optical detection portions.

12. An optical information recording/reproducing apparatus according to claim 11, wherein said information detection means includes read detector selection means for selecting predetermined address positions of said plurality of optical detection portions in accordance with the address positions of said optical detection portions corresponding to the position of said guide track detected by said track position detection means.

13. An optical information recording/reproducing apparatus according to claim 12, wherein said information detection means includes read offset means for offsetting the address positions of said optical detection portions corresponding to the position of said guide track detected by said track position detection means by a predetermined read offset value, and said read detector selecting means selects the offset address positions of the optical detection portions.

14. An optical information recording/reproducing apparatus according to claim 13, wherein said predetermined read offset value used in said read offset means is a distance between the center of a guide track on said record medium to the center of an information track.

15. An optical information recording/reproducing apparatus according to claim 1, wherein said optical detection means comprises a linear optical sensor having a plurality of optical detection portions disposed in a line in the direction vertical to an image of guide tracks so as to detect the light reflected from a plurality of guide tracks.

* * * * *